US011275195B2

(12) United States Patent
Teague et al.

(10) Patent No.: US 11,275,195 B2
(45) Date of Patent: Mar. 15, 2022

(54) METHODS AND MEANS FOR AZIMUTHAL NEUTRON POROSITY IMAGING OF FORMATION AND CEMENT VOLUMES SURROUNDING A BOREHOLE

(71) Applicant: Visuray Intech Ltd (BVI), Tortola (VG)

(72) Inventors: Philip Teague, Houston, TX (US); Alex Stewart, San Francisco, TX (US)

(73) Assignee: Visuray Intech Ltd (BVI), Road Town (VG)

( * ) Notice: Subject to any disclaimer, the term of this patent is extended or adjusted under 35 U.S.C. 154(b) by 0 days.

(21) Appl. No.: 17/108,734

(22) Filed: Dec. 1, 2020

(65) Prior Publication Data

US 2021/0109247 A1 Apr. 15, 2021

Related U.S. Application Data

(63) Continuation of application No. 16/686,804, filed on Nov. 18, 2019, now abandoned, which is a continuation of application No. 16/387,708, filed on Apr. 18, 2019, now abandoned, which is a continuation of application No. 15/845,554, filed on Dec. 18, 2017, now abandoned, which is a continuation-in-part of application No. 15/707,220, filed on Sep. 18, 2017, now abandoned, and a continuation-in-part of application No. 15/589,025, filed on May 8, 2017, now abandoned, said application No. 15/707,220 is a continuation of
(Continued)

(51) Int. Cl.
*G01V 5/10* (2006.01)
*G01N 15/08* (2006.01)

(52) U.S. Cl.
CPC ......... *G01V 5/108* (2013.01); *G01N 15/0806* (2013.01); *G01V 5/10* (2013.01); *G01N 15/088* (2013.01)

(58) Field of Classification Search
CPC ...... G01V 5/10; G01V 5/108; G01N 15/0806; G01N 15/088
See application file for complete search history.

(56) References Cited

U.S. PATENT DOCUMENTS 5,374,823 A * 12/1994 Odom ................... G01V 5/104
250/269.1
7,544,929 B1 * 6/2009 Mickael ................ G01V 5/104
250/269.5
(Continued)

*Primary Examiner* — David P Porta
*Assistant Examiner* — Fani Boosalis
(74) *Attorney, Agent, or Firm* — Adams and Reese LLP; Raymond R. Ferrera

(57) ABSTRACT

A first example azimuthal neutron porosity tool for imaging formation and cement volumes surrounding a borehole is provided, the tool including at least an internal length comprising a sonde section, wherein said sonde section further comprises one sonde-dependent electronics; a slip-ring and motor section; and a plurality of tool logic electronics and PSUs. An alternative azimuthal neutron porosity tool for imaging formation and cement volumes surrounding a borehole is also provided, the tool including at least a far space detector; a near space detector; and a source located within a moderator shield that rotates around an internal tool axis.

12 Claims, 3 Drawing Sheets

Related U.S. Application Data application No. 15/427,323, filed on Feb. 8, 2017, now abandoned, said application No. 15/707,220 is a continuation of application No. 15/427,323, filed on Feb. 8, 2017, now abandoned, said application No. 15/589,025 is a continuation of application No. 15/275,676, filed on Sep. 26, 2016, now abandoned.

(60) Provisional application No. 62/292,616, filed on Feb. 8, 2016, provisional application No. 62/233,023, filed on Sep. 25, 2015.

(56) References Cited

U.S. PATENT DOCUMENTS

| | | | |
|---|---|---|---|
| 9,012,836 B2 * | 4/2015 | Wilson | G01V 5/101 |
| | | | 250/254 |
| 2002/0096363 A1 * | 7/2002 | Evans | E21B 49/00 |
| | | | 175/41 |
| 2009/0115623 A1 * | 5/2009 | Macpherson | G01V 11/002 |
| | | | 340/853.1 |
| 2010/0193675 A1 * | 8/2010 | Stoller | G01V 5/10 |
| | | | 250/254 |
| 2011/0238313 A1 * | 9/2011 | Thornton | G01V 5/107 |
| | | | 702/8 |
| 2015/0052988 A1 * | 2/2015 | Price | E21B 47/024 |
| | | | 73/152.17 |

* cited by examiner

METHODS AND MEANS FOR AZIMUTHAL NEUTRON POROSITY IMAGING OF FORMATION AND CEMENT VOLUMES SURROUNDING A BOREHOLE

FIELD

The present invention relates generally to azimuthal neutron porosity imaging of formation and cement volumes surrounding a borehole, and in a specific though non-limiting embodiment to methods and means for enabling a wireline operator to evaluate the homogeneity of cement disposed behind a casing using azimuthal neutron porosity imaging.

BACKGROUND

Neutron tools have been used for several decades to measure the neutron porosity and hydrogen index of earth formations. Modern tools typically use pulsed neutron sources and thermal and/or epithermal neutron detectors for the measurement of the neutron flux of the neutrons at several distances from the neutron source. Additionally, the neutron "slowing down time," as measured by one or more of the detectors, is a shallow measurement of hydrogen index and very sensitive to standoff. The traditional porosity measurement relies on deriving liquid filled porosity from the ratio of the neutron fluxes from at least two different distances from the source.

Unfortunately, such neutron logging tools are unable to offer azimuthal logging information. Rather, the two or more detector assemblies are spaced apart longitudinally along the body of the neutron logging tool a short distance from the neutron source, and the detector assemblies are in line with each other along a central axis of the tool.

Consequently, the detector assemblies make their detections of the adjacent wall of the borehole without regard to direction or orientation. Instead, the intention of the multiple detector assemblies is to provide different formation and statistical sensitivities during logging operations.

The detectors closest to the neutron generator ("near space") are typically more sensitive and responsive to the borehole, and the detector assemblies further from the neutron generator ("far space") are typically more sensitive and responsive to the formation. The sigma capture cross-section of the borehole and borehole's surroundings may then be determined by applying different weights to the near space readings as compared to the far space readings.

For example, in a tool with two detectors, 70% weight may be given for the near detector reading and 30% weight for the far detector reading. A typical open-hole neutron logging tool is usually run decentralized to the wellbore with an offset spring such that the neutron logging tool effectively runs along one wall of the wellbore.

More current logging tools have multiple detectors spaced about the circumference of the tool. The detectors are often shielded from one another such that each detector detects from the area of the borehole and formation to which it is closest. The readings from each detector are then associated with the orientation of that detector in order to provide information regarding the incident direction of the incoming particles or photons. The orientation-specific data is then analyzed to provide a basic azimuthal log.

However, there are no existing tools that enable cased-hole logging techniques in order to determine the porosity of the cement volume around the casing of the borehole, nor does the prior art teach or suggest a way to increase the azimuthal resolution of such tools without increasing the number of circumferentially located detectors with a consequential decrease in inter-detector shielding.

For example, U.S. Pat. No. 8,664,587 to Evans et al. discloses a method and means for creating azimuthal neutron porosity images in a 'logging while drilling' environment. As bottom hole assembly based systems historically relied upon the rotation of the drill string to assist in the acquisition of azimuthally dependent data, the patent discusses an arrangement of azimuthally static detectors that could be implemented in a modern BRA, which does not necessarily rotate with the bit, by subdividing the neutron detectors into a plurality of azimuthally arranged detectors shielded within a moderator so as to infer directionality to incident neutrons and gamma rays.

U.S. Pat. No. 9,012,836 to Wilson et al. discloses a method and means for creating azimuthal neutron porosity images in a wireline environment. In much similarity to U.S. Pat. No. 8,664,587, the patent discusses an arrangement of azimuthally static detectors which could be implemented in a wireline tool in order to assist an operator in interpreting logs post-fracking by subdividing the neutron detectors into a plurality of azimuthally arranged detectors shielded within a moderator so as to infer directionality to incident neutrons and gamma rays.

U.S. Pat. No. 5,374,823 to Odom discloses a well logging tool that depends upon neutron bursts for determining inelastic energy spectra and thermal neutron capture cross-sections during a single logging pass over a well depth interval.

US 2011/0238313 by Thornton et al. discloses a method for correction of borehole effects in a neutron porosity measurement. Two or more neutron detectors are used to determine the azimuthal component that could be attributed to the non-padded side of the tool such that a caliper may not be required.

Finally, U.S. Pat. No. 8,421,004 to Molz et al. discloses a method of building detectors within a moderating material or shield for either neutrons or gamma rays.

Nowhere, however, does the prior art teach, suggest, or apparently even contemplate methods and means for azimuthal neutron porosity imaging of formation and cement volumes surrounding a borehole as described and claimed below.

SUMMARY

An azimuthal neutron porosity tool for imaging formation and cement volumes surrounding a borehole is provided, the tool including at least an internal length comprising a sonde section, wherein said sonde section further comprises one sonde-dependent electronics; a slip-ring and motor section; and a plurality of tool logic electronics and PSUs.

An alternative azimuthal neutron porosity tool for imaging formation and cement volumes surrounding a borehole is also provided, the tool including at least a far space detector; a near space detector; and a source located within a moderator shield that rotates around an internal tool axis.

BRIEF DESCRIPTION OF SEVERAL REPRESENTATIVE EMBODIMENTS

The invention described herein comprises methods and means for enabling a wireline operator to evaluate the homogeneity of cement behind a casing through azimuthal neutron porosity imaging. Generally, the underlying goal of the process is to determine cement integrity and zonal isolation.

The methods and means also permit evaluation of cement behind the casing when the wireline tool is located within tubing inside the cemented casing. This is especially useful when considering plug and abandonment operations where it would be advantageous to determine the nature of the zonal isolation and the integrity of cement disposed within the casing prior to removal of the tubing.

The methods and means also permit azimuthal information to be attained during logging of open-hole environments, which would be of particular value when determining fracture efficiencies and fracture biases in the formation after fracking operations have been performed. The system does not preclude the possibility of combination with other forms of cement characterization, such as acoustic or x-ray, or combination with other types of well logging methods.

Figure 1:
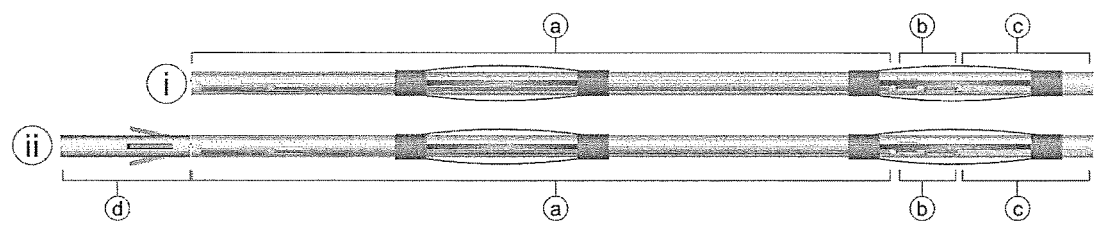
FIG. 1 is a plan view of a practical means for practicing the methods claimed herein within the confines of a borehole tool.

With reference now to the attached drawings, FIG. 1 is a plan view of a practical means for practicing the methods within the confines of a borehole tool, configured where i illustrates the cased-hole variant of the means including centralizers. Internal length a comprises a sonde section and various sonde-dependent electronics; b the slip-ring and motor section; and c the overall tool logic electronics and PSUs.

Element ii illustrates a possible open-hole variant that includes a multi-azimuthal caliper d used to assist in the determination of borehole volume for borehole effect compensation.

Figure 2:
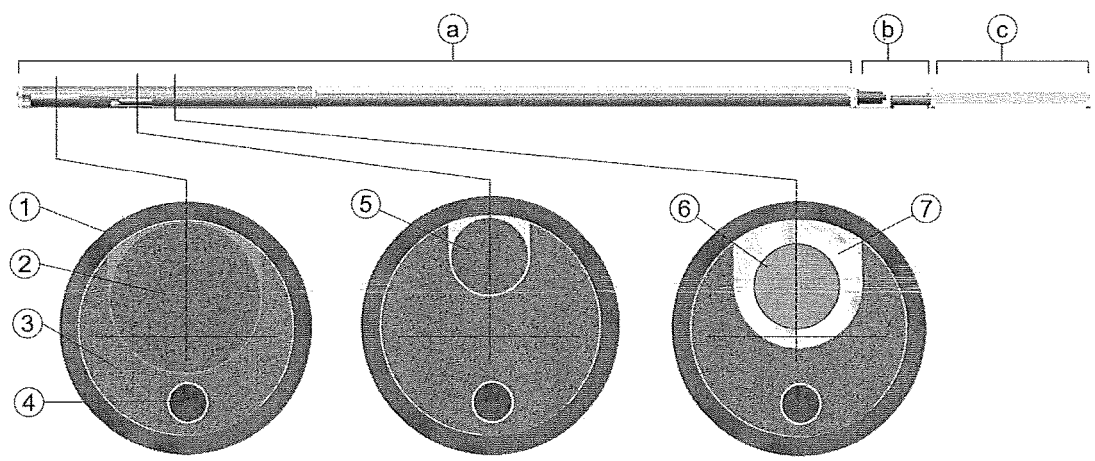
FIG. 2 expands on the plan view of FIG. 1, further comprising a far space detector, a near space detector, and a source located within a moderator shield.

FIG. 2 expands on the plan view of FIG. 1, depicting a far space detector 2; a near space detector 5; and a source 7 located within a moderator shield (e.g., epoxied boron) 3 that rotates inside a tool housing 1 being driven by a motor in section b. The whole of section a rotates such that slip rings must be located at either end of the section to permit through-wiring 4.

Figure 3:
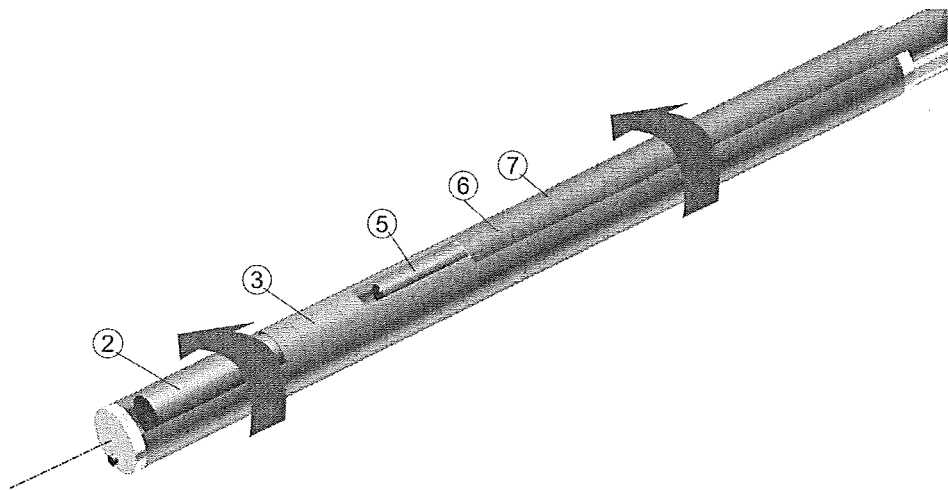
FIG. 3 is an alternative plan view showing a far space detector, a near space detector, and the source located within a moderator shield that rotates around an internal tool axis.

FIG. 3 depicts an alternative plan view showing the far space detector 2; the near space detector 5; and the source 7 located within a moderator shield (e.g., epoxied boron) 3, which rotates around the internal tool axis. In this embodiment the source reaction plane 6 rotates together with the detectors 5 and 2.

Figure 4:
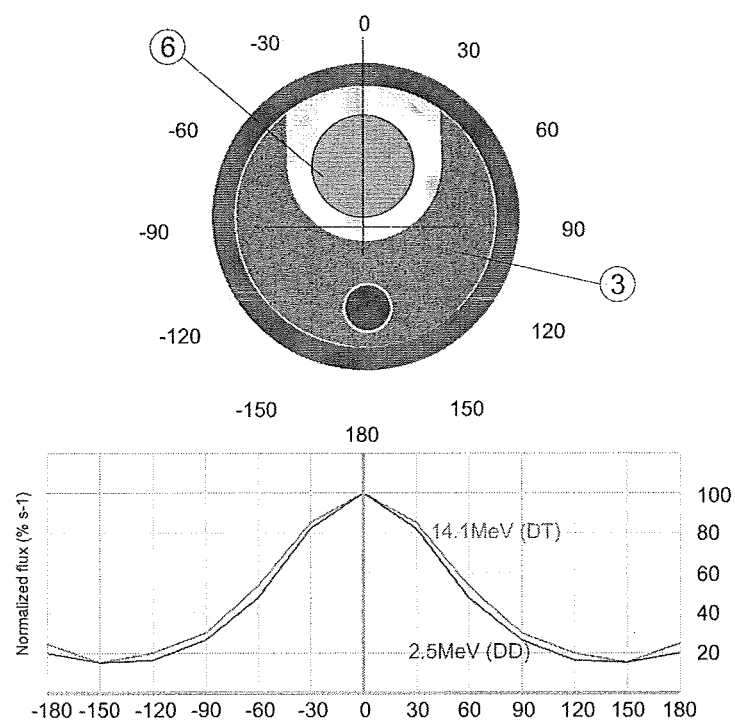
FIG. 4 illustrates an example distribution of energies around the tool as a result of output from the reaction plane of the PNG tube.

As seen in FIG. 4, the boron shield 3 can manifest in a distribution of energies around the tool as a result of output from the reaction plane 6 of the PNG tube. At such close proximity to the source, the difference in moderation between the DT and DD output is very similar. The boron shield permits strong directional bias of the output, which can enable deconvolution of the resulting logs.

Figure 5:
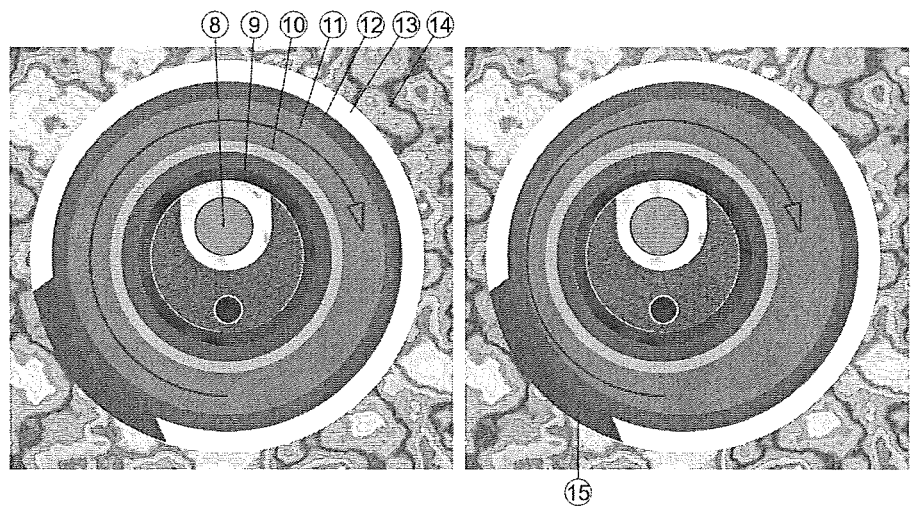
FIG. 5 illustrates that when rotating the source and detectors within the tool housing, the volume of the fluid surrounding the tool inside of the production tubing can be treated as contiguous with the annular fluid such that any eccentricity of the tubing within the casing will manifest in a time-based elliptical function at the detectors.

As seen in FIG. 5, by rotating the source and detectors 8 within the tool housing "9", the volume of the fluid surrounding the tool inside of the production tubing 10 can be treated as contiguous with the annular fluid 11 such that any eccentricity of the tubing 10 within the casing 12 will manifest in a time-based elliptical function at the detectors. Any anomaly 15 in the cement 13 will be prominent within this elliptical function. Critical isolation zones are generally not located within high porosity regions such as the reservoir, so the formation 14 porosity should be generally lower than the anomaly 15.

In one example embodiment, herein called the open-hole means (See, for example, FIG. 1, element ii) comprises a pressure housing (FIG. 2, element 1) which is conveyed axially through a borehole by means of a wireline. The tool comprises four main sections, with the exclusion of a step-down power supply, telemetry, accelerometer, and cable head assembly section. In this embodiment, the first section (FIG. 1, element d) is a multi-fingered caliper with at least 3 arms, used to determine the borehole volume near the sonde of the tool. The second section (FIG. 1, elements a, b and c) contains a pulsed neutron generator (FIG. 2, element 7) of either Deuterium-Tritium type or Deuterium-Deuterium type, which is located offset within a single molded boron-composite moderator cylinder (FIG. 2, element 3).

In a further embodiment, a near space detector (FIG. 2, element 5) and a far space detector (FIG. 2, element 2) are located within the same boron composite chassis, all arranged into the same azimuthal polar direction. This assembly (FIG. 2, element a), along with the generator-control electronics and detector electronics, is rotated around the axis of the tool by means of a motor (FIG. 2, element b). The source and detector power (e.g., 48 VDC, ground), along with internal communications and data bus (CAN) and through wiring (4×AWG 22), are connected to the rotating assembly via a slip ring at each end of the assembly, so that the motor and housing remains azimuthally fixed to the wireline orientation.

As the assembly rotates (FIG. 3), the generator is activated and the reaction plane (FIG. 3, element 6) emits isotropically. The boron moderator chassis (FIG. 3, element 3) causes a strong bias in the azimuthal output direction of the neutron flux (FIG. 4) which is further compounded by the moderation of neutrons when inbound particles are entering the detectors. In this embodiment, the pulsed neutron generator will operate at a frequency of approximately 1000 Hz with a duty cycle of around 10% and a gross output of $10^8$ $ns^{-1}$. If the source and detector assembly rotates at one rotation per second, the entire response can be deconvoluted over the rotation of the system with the response from the spread of 1000 pulses.

This arrangement can be treated as an azimuthal spiral log, which would enable the creation of a two-dimensional porosity map of the surrounding borehole; moreover, the data can be amalgamated so as to produce a single depth-based log of porosity with 6-inch depth intervals at 1,800 ft/hr. A neutron tool with a similar source output can expect an accuracy of 0.5 p.u. in porosities less than 7 p.u., ±7% p.u. in the range 7 to 30 p.u., and ±10% p.u. in the range 30 to 60 p.u. However, when logging at a lower line speed, such as 900 ft/hr, statistical accuracy in the higher porosity ranges are such that differences between cement volumes and fluid volumes are easily distinguished.

In yet another embodiment, a caliper section (FIG. 1, element d) is not required, as the tool will run in a cased-hole to evaluate the cement behind the casing. The hole volume within the casing is known, and the borehole geometry can be established from the existing open-hole caliper log. In this embodiment, the tool runs centralized. The largest porosity changes expected within the area around the casing would be anomalies in the cement caused by intrusion of fluids into the cement or poor cement placement. Washout sections of formation will also be prominent in the data, thus affecting the far-space detector more than the near-space. Due to the low neutron capture cross-section of the casing material the log will respond well to hydrogen rich regions such as fluids.

In a still further embodiment, the tool comprises a gamma detector, so that activation of elements within the surroundings of the borehole (e.g., limite chlorine and/or oxygen, etc.), can be analyzed with a directional bias through the resultant emission of gamma radiation from said elements due to activation by neutrons. In this respect, anomalies within the cement regions can be further identified through the anticipated variation of elemental composition such as the variation in oxygen between cement and one or more fluid-filled voids, in combination with the hydrogen index of the region as described above.

In a further embodiment still, the tool runs inside the production tubing centralized. Any variation in the eccentricity of the tubing compared to the casing will manifest in a-time-based elliptical function (FIG. 5) such that the general variation in a group of rotations will establish the most probable eccentricity. Optimally, the near space detector or detectors will provide a borehole effect weighting, such that the far space (with a larger depth of investigation) will provide a larger proportion of the cement porosity distribution. In this embodiment, fluid within the cement volume will stand out against the elliptical or continual function of either eccentric or centralized tubing respectively.

In most embodiments, using a plurality of detectors at various geometric spacing will achieve a best case depth of investigation; statistical biasing information can also be considered. The use of Boron as a shield can also be replaced by other materials which exhibit similar characteristics, and various ultrasonic caliper methods can also be used instead of mechanical caliper arms to ascertain borehole volume. Various other detector types, tube types, isotope types (e.g., as chemical alternatives to PNG) and directional computation methods will be appreciated by ordinarily skilled artisans as practical within the scope of the instant disclosure.

In a further embodiment, the tool is located within logging-while-drilling, bottom hole assembly in an open-hole drilling environment, such that is can be powered by a mud-turbine generator or other suitable means, and the resulting azimuthal porosity response be used to steer a steerable drilling unit such that the path of the drill-bit may be biased towards the hydro-carbon-bearing layers of the reservoir.

As described and depicted in the example embodiments discussed above and illustrative drawing figures accompanying herewith, the present invention has many practical technical advantages. No current technology exists which is capable of evaluating cement-homogeneity behind multiple strings or behind casings and tubing.

The invention overcomes issues within prior art when considering the treatment and compensation of the borehole effects surrounding the tool as a function of the borehole volume. In a multiple string environment, the elliptical distribution treatment of porosity response allows for such compensation, such that the porosity of the target region around the casing can be determined.

For example, by rotating the source with the detectors a much greater statistical bias can be achieved compared to simply shielding fixed detectors alone, as the neutron output is biased to form a directionality; this arrangement therefore results in a much greater azimuthal resolution than a fixed plurality of circumferentially spaced detectors.

The rotating system also permits much larger detector volumes to be used compared to many smaller fixed detectors, which is important for detector efficiency when considering $He_3$ where efficiency is governed by volume and pressure.

Moreover, the use of porosity measurements for cement evaluation leads to better determination of fluid volumes within a column of 'sagged' cement. For example, the relative porosity of the fluid will be approximately 100 p.u. while porosity of the cement will be significantly lower.

Also, the use of activation measurements (e.g., gamma) in addition to the porosity (e.g., hydrogen index) measurements can lead to a higher definition anomaly detection method.

In addition, the results (or original data) can be combined with other measurement methods, such as acoustic or x-ray density, thereby adding to the certainty of the measurement.

Though the present invention has been depicted and described in detail above with respect to several exemplary embodiments, those of ordinary skill in the art will also appreciate that minor changes to the description, and various other modifications, omissions and additions may also be made without departing from either the spirit or scope thereof.

The invention claimed is:

1. An azimuthal neutron porosity tool for imaging of formation and cement volumes surrounding a borehole, said tool comprising:
   an internal length comprising a sonde section, wherein said sonde section further comprises one or more sonde-dependent electronics;
   a slip-ring and motor section;
   a plurality of tool logic electronics and PSUs;
   a source and at least one detector, both the source and at least one detector being located inside a tool housing with a bias from an internal tool axis; and
   a motor for rotating the source and the at least one detector relative to the tool housing around the internal tool axis to generate azimuthal neutron porosity information, the azimuthal neutron porosity information being neutron porosity information in association with the corresponding azimuth relative to the internal tool axis.

2. The tool of claim 1, further comprising a multi-azimuthal caliper used to assist in the determination of borehole volume for borehole effect compensation.

3. The tool of claim 1, wherein the at least one detector includes a far space detector and a near space detector; and wherein the source is located within a moderator shield.

4. The tool of claim 3, wherein said moderator shield further comprises an epoxied boron.

5. The tool of claim 3, wherein said shield further comprises cadmium.

6. The tool of claim 1, wherein the tool rotates such that slip rings are disposed at either end so as to permit through-wiring.

7. An azimuthal neutron porosity tool for imaging of formation and cement volumes surrounding a borehole, said tool comprising:

a far space detector;

a near space detector;

and a source located within a moderator shield, which permits directional bias of the output of the source;

wherein the source and at least one of the far space detector and the near space detector are located with a bias from an internal tool axis, and rotates around the internal tool axis to generate azimuthal neutron porosity information, the azimuthal neutron porosity information being neutron porosity information in association with a corresponding azimuth relative to the internal tool axis.

8. The tool of claim 7, further comprising a source reaction plane that rotates together with said near space and far space detectors.

9. The tool of claim 7, wherein said moderators shield further comprise an epoxied boron.

10. The tool of claim 7, wherein said shield further comprises cadmium.

11. The tool of claim 9, wherein said epoxied boron shield permits strong directional bias of the output, thereby enabling deconvolution of the resulting logs.

12. The tool of claim 10, wherein said cadmium shield permits strong directional bias of the output, thereby enabling deconvolution of the resulting logs.

* * * * *